Oct. 21, 1969     W. H. HULTGREN     3,473,664

OIL FILTER UNIT

Original Filed July 19, 1966     2 Sheets-Sheet 1

INVENTOR
*William H. Hultgren*

BY *Lawrence J. Winter*

ATTORNEY

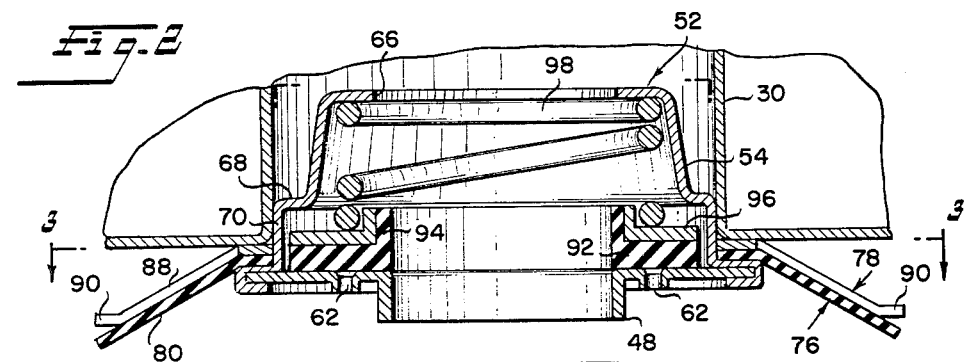
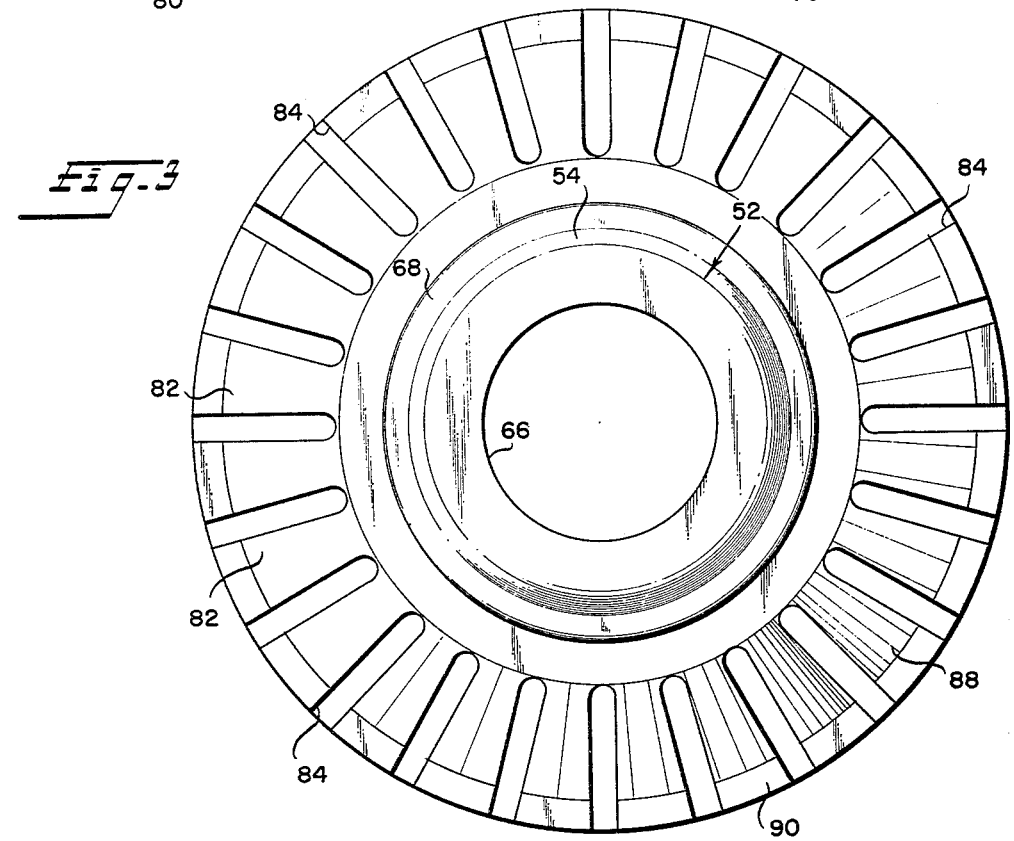
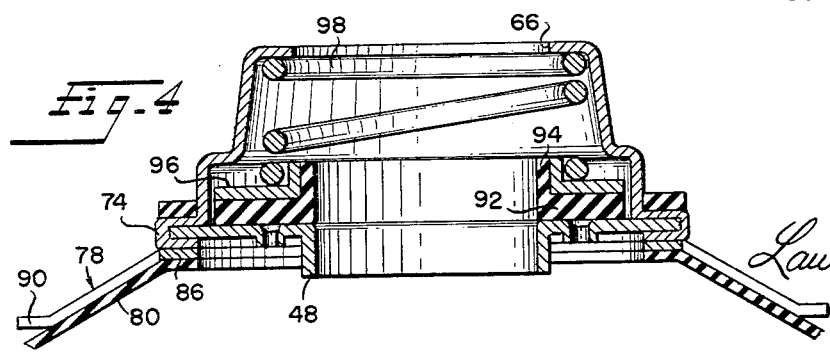

United States Patent Office 3,473,664
Patented Oct. 21, 1969

3,473,664
OIL FILTER UNIT
William Herbert Hultgren, West Hollywood, Fla., assignor to Champion Laboratories, Inc., West Salem, Ill., a corporation of Connecticut
Continuation of application Ser. No. 566,300, July 19, 1966. This application Feb. 26, 1968, Ser. No. 708,421
Int. Cl. B01d 27/06, 27/00
U.S. Cl. 210—130                              1 Claim

ABSTRACT OF THE DISCLOSURE

A spin on type oil filter having an annular filter element therein and provided adjacent the inlet end with an integral valve assembly consisting of a bypass valve and an anti-drainback valve formed as a single unit. The anti-drainback valve is secured to the circumferential portion of the bypass valve casing and is provided with an elastomeric disc that is backed up over substantially its entire area by a resilient metal spring member.

This is a continuation of U.S. application Ser. No. 566,300, filed July 19, 1966, and now abandoned.

The present invention relates to a filter and more particularly to an oil filter unit of the twist on or spin on type in which the filter cartridge is sealed permanently or secured within the filter casing or shell and which can be easily and quickly threaded onto an engine into its operating position.

It is an object of the present invention to provide a throwaway type oil filter that is provided with a maximum amount of filtering surface or space within the casing housing the filter cartridge.

It is another object of the present invention to provide a throwaway type of oil filter unit that is provided with means for bypassing oil around the filter cartridge when it becomes clogged with contaminants and the like so that the engine will not be starved of oil.

It is another object of the present invention to provide a spin on type throwaway oil filter unit having anti-drain back valve means therein so that after the oil initially enters the oil filter cartridge it cannot flow back out of the cartridge so that when the engine is stopped, the oil will not drain out by gravity back to the oil pump, so that upon restarting the engine there will be a sufficient amount of oil to lubricate the parts properly.

It is another object of the present invention to provide a spin on type oil filter unit that has a by-pass or relief valve assembly disposed adjacent the inlet end of the filter housing so that when the oil filter is clogged, the flow of oil through the filter housing will be short circuited directly to the outlet thereof and avoid carrying any contaminants downstream of the cartridge that may be caked on the outer surface or the inlet side of the oil filter cartridge.

It is another object of the present invention to provide an oil filter unit that has a split flow or divided oil stream flow path, with all of the oil passing through a first oil flow stream path and being filtered by the oil filter cartridge during the usable service life of the oil filter cartridge, while the entire oil stream passes through a second flow path, when the oil filter cartridge becomes contaminated, and thus the resistance to flow of the oil through the filter housing is by a single resilient or biasing means, and never two biasing means disposed in series flow relationship with one another.

It is another object of the present invention to provide an oil filter unit that has a combination by-pass valve and anti-drain back valve assembly formed as a single unit and in which the by-pass valve assembly is provided with a sleeve member to which the anti-drain back valve means is secured so that the assembly can be readily inserted within a filter housing or shell, as distinguished from the conventional arrangement whereby the anti-drain back valve and the by-pass valve are two separate and independent members that require two steps in the method of assembly thereof in a filter housing.

It is another object of the present invention to provide a compact and economical combination by-pass valve and anti-drain back valve means forming an integral unit which can be readily inserted into the center tube of a filter so that the anti-drain back valve is always uniformly positioned in its proper place within the cartridge during assembly of the unit.

It is yet another object of the present invention to provide an anti-drain back valve means secured to the by-pass valve assembly so that it is properly positioned concentrically with respect to the oil inlet means and the oil discharge means in the filter housing.

It is another object of the present invention to provide a by-pass valve assembly and an anti-drain back valve secured thereto which extends a minimum radial distance from the central discharge opening of the filter housing.

It is another object of the present invention to provide a single valve means which comprises a by-pass valve assembly and an anti-drain back valve assembly with a resilient disc member and a resilient metallic member disposed adjacent the resilient disc member for maintaining the anti-drain back valve in a closed position.

It is yet another object of the present invention to provide a combined anti-drain back valve and by-pass valve assembly in which the biasing means of the anti-drain back valve is secured to the cartridge support means by the by-pass valve assembly and is not freely and loosely disposed within the filter shell so as to be misaligned therein to vary the uniform pressure generally required of the anti-drain back valve means.

It is yet another object of the present invention to provide a by-pass valve assembly and an anti-drain back valve assembly forming an integral unit in which the by-pass valve means is set to be opened at a predetermined differential pressure across the filter element which is set above the predetermined differential pressure setting of the anti-drain back valve means, and in which the flow of oil after passing into the oil inlet means will either pass around the anti-drain back valve means, or in the alternative pass through the by-pass valve means.

Various other objects and advantages of the present invention will be readily apparent from the following detailed description when considered in connection with the accompanying drawings forming a part thereof and in which:

FIGURE 2 is an enlarged detail view of the by-pass and anti-drain back valve assembly of the present invention;

FIGURE 3 is a top plan view taken along the lines 3—3 of FIGURE 2 illustrating the anti-drain back valve of the present invention; and FIGURE 4 is a detail view of another modification of the invention.

Figure 1:
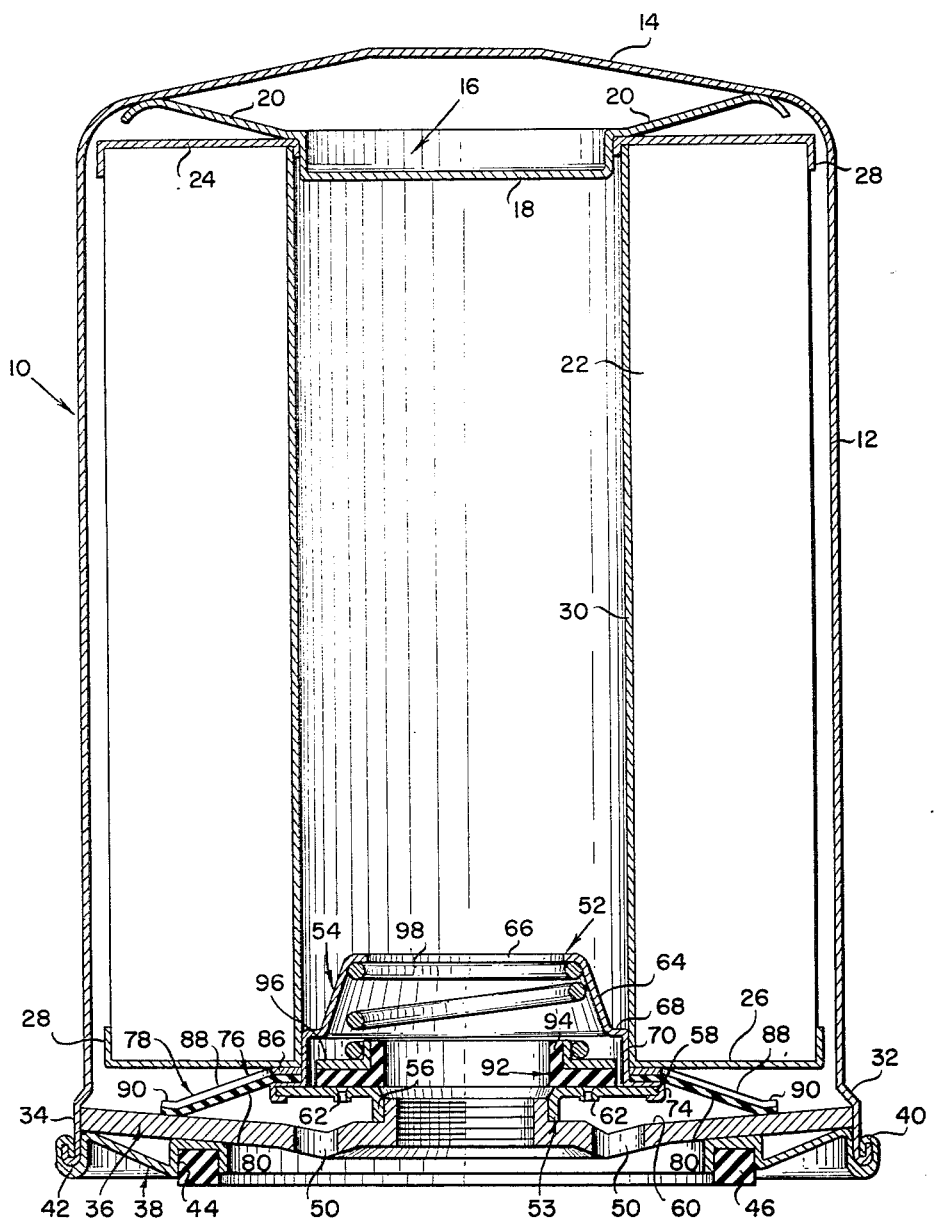
FIGURE 1 is a side elevational view in section illustrating the oil filter unit embodied in the present invention.

Referring to the drawings the reference numeral 10 generally designates an oil filter unit provided with a casing or cylindrical housing 12 that is closed at its upper end 14 and is open at its opposite lower end. The end 14 is dome shaped and is provided with a metal member 16 having a circular cup 18 with a plurality of radially outwardly extending finger members 20 adapted to force or push a filter cartridge 22 downwardly in the housing.

The filter cartridge 22 is of annular configuration and is preferably of a well known resin impregnated pleated paper type with an upper end cap 24 and a lower end cap 26 sealing off the opposite edges of the pleats. The end caps 24 and 26 are secured to the pleat edges by any well known adhesive and have inturned rims 28.

A perforated center tube 30 is provided within the pleats and is open at its top and bottom. The upper end of the center tube 30 is sealed or closed by the cup 18 of the metal member 16.

The lower open end of the housing 12 is provided with an outwardly flared rim 32 which thereafter extends vertically downwardly as indicated at 34. This open end of the filter shell or housing is closed off by a relatively thick reinforcement plate 36. Plate 36 has its outer periphery or circumference disposed within the portion 34 of the housing and extends into the housing to a point adjacent the rim 32.

Reinforcement plate 36 is positioned within the open end of the filter housing 12 by an annular retainer plate 38 which has an outer lip 40 which is rolled over a corresponding lip 42 of the filter shell to form a fluid tight rolled seam therewith.

The retainer plate 38 is preferably tack welded or secured by any other suitable means to the outer surface of the reinforcement plate 36. The inner circumference of the retainer plate 38 is provided with an annular rib that forms a recess 44 therein for receiving a ring gasket 46. When the spin on filter is threaded onto the engine block the gasket 46 provides an oil tight seal with the engine block so that there can be no leakage of oil between the engine block and the filter housing.

A central inturned and threaded boss or nipple 48 is disposed in the reinforcement plate 36 and extends upwardly into the filter housing. The nipple 48 provides an oil outlet opening from the filter housing. A plurality of oil inlet ports or openings 50 are disposed radially outwardly of the nipple 48 and circumferentially spaced around the nipple for receiving contaminated oil into the filter housing from the engine for purification thereof.

The combination valve assembly of the present invention generally designated 52 is disposed around the nipple 48 within the filter housing and is provided with a sleeve support member 53 and a valve casing member 54. The sleeve support member 53 comprises a vertical portion 56 and a substantially horizontally and radially outwardly extending section 58 upon which the filter cartridge 22 is supported. The sleeve support member 53 is disposed over the nipple 58 and the horizontal portion 58 is disposed in spaced relationship with the inlet ports 50 and the reinforcement plate 36 so as to provide an oil inlet chamber 60 in the housing. The horizontal portion 58 extends beyond the inlet ports 50 and is provided with a plurality of by-pass ports 62 therein disposed slightly inwardly of the oil inlet port 50.

The by-pass valve casing 54 has a diagonally inclined upper portion 64 with a central opening 66 therein for receiving the discharge of oil from the oil filter cartridge. The inclined wall 64 has a horizontal portion 68 adjacent its bottom and then extends vertically downwardly as at 70. The portion of the casing 54 below the vertical portion 70 extends horizontally outwardly as indicated at 72 and is provided with a lip 74 bent around and under the horizontal portion 58 of the sleeve support member 52 so as to permanently secure the casing 54 thereto.

An anti-drain back valve 76 is secured to the casing 54 adjacent the horizontal portion 72. The anti-drain back valve comprises an annular elastomeric member and leaf spring 78 or diaphragm spring. Referring to FIGURE 3 it will be noted that the leaf spring 78 comprises a substantially circular or annular configuration with a plurality of radially extending fingers 82 between which are slots 84. The central circumferential portion 86 of the leaf spring is horizontal while the inclined portion 88 adjacent thereto is inclined and terminates in a horizontal rim portion 90. The flat horizontal portion 86 is disposed on top of the central portion of the resilient anti-drain back valve disc 80 and forms an interference fit on the vertical portion 70 of the casing 54 so that it is secured thereto. The portions 88 and 90 of the leaf spring and the corresponding portions of the resilient valve disc 80 extend radially outwardly of the oil inlet ports 50 and are approximately adjacent the sealing ring 46 of the retainer plate. The central portion of the disc 80 and the flat portion 86 of the leaf spring are both sandwiched between the lower end cap 26 of the cartridge and the horizontal portion 58 of the sleeve port member 52.

A resilient by-pass valve of annular configuration indicated as 92 is disposed within the casing 54 and seats over or closes off the by-pass ports 62 when in a seated position. The valve disc 92 is provided with a vertical portion 94 and has a metal L-shaped member 96 disposed thereon. A biasing spring 98 normally urges the disc 92 into a seated position over the by-pass ports 62.

Referring to FIGURE 2 this detail drawing discloses that the valve assembly 52 comprises a single integral unit which is a combination of the by-pass valve assembly and the anti-drain back valve consisting of the rubber resilient valve disc 80 and the leaf spring 88 secured to the casing 54 of the by-pass valve assembly. Thus this unit forms a single member that is inserted within the housing of the filter and the only other members that are inserted within the filter shell 12 are the members 16 and the filter cartridge itself.

With this single assembly of the leaf spring valve and the by-pass valve there is no chance of the parts becoming disarranged within the filter housing, during the manufacture thereof, or is there any problem in connection with the leaf spring and the rubber anti-drain back valve disc 80 becoming displaced or misaligned with respect to each other, as has occurred heretofore where the anti-drain back valve and the biasing means therefor are not fixedly secured together, as in the present invention.

In addition the structure of the present invention provides an anti-drain back valve that has a uniform and equal pressure applied to it through the leaf spring completely around the desired portion of the anti-drain back valve. In other words the securing of the leaf spring and the anti-drain back valve disc on the casing during the assembly thereof, and before the bypass valve assembly and the anti-drain back valve assembly are inserted within the filter housing or within the center tube of the filter cartridge 22 insures the exact location of the parts after the assembly is sealed within the interior of the casing.

In operation, when it is desired to filter oil from an engine, not shown, the oil filter unit 10 is threaded by the threads 48 onto an engine block. The oil passes into the filter housing 12 through the oil inlet port 50 when the oil pressure is below a predetermined value the oil will pass underneath the anti-drain back valve disc 80, raising the valve disc 80 from a seated position with its outer edge in contact with the reinforcement plate 36. Thereafter the oil will flow up around the annular chamber formed between the outer edges of the filter cartridge and the inner surface of the cylindrical wall 12 and pass in a radially inward direction into the center tube 30 therein. The pleated paper will filter out any contaminants that are in the oil.

When the filter element has become sufficiently clogged with dirt and contaminants so that the oil pressure exceeds a predetermined value in excess of the force in the spring 98 maintaining the by-pass valve 92 in a seated position on by-pass oil ports 62, the oil pressure will unseat the valve 92 from the oil by-pass ports 62 and the oil will flow through the ports and out of the nipple 48, short circuiting the oil filter cartridge so as to supply oil to the engine and not starve it.

It will be noted that with the structure of the present invention the oil flowing through the ports 50 passes either in a radially outwardly direction and around and under the anti-drain back valve 80, or in the alternative when a filter becomes clogged the oil will pass radially inwardly through the by-pass ports 62 and out of the discharge outlet 48. In neither case does the oil have to overcome the cumulative forces of both biasing members, namely leaf spring 78 and spring 98.

Referring to the embodiment shown in FIGURE 4 this is substantially the same as that described in connection with FIGURES 1 to 3 except that the anti-drain back valve 76 is secured to the bottom of the lip 74 by tack welding or other suitable means. The rubber anti-drain back disc may be secured by any suitable adhesive or cement to the leaf spring along the inner flat portion 86. Thus in this embodiment of the invention the anti-drain back valve 76 is secured to the casing 64 of the by-pass valve assembly, except that it is not sandwiched between the end cap or the filter cartridge and the filter support member.

The operation of this embodiment of the invention is substantially the same as that already described for the embodiment shown in FIGURES 1 to 3.

From the foregoing description it is apparent that the present invention provides a compact and inexpensive integral by-pass valve and anti-drain back valve assembly forming a single unit so that it can be preassembled in a fixed position within a filter cartridge. This avoids any misalignment of the anti-drain back valve with respect to the oil discharge outlet, as well as any misalignment of the rubber or resilient gasket member of the anti-drain back valve and its resilient or leaf spring biasing means.

It is also apparent that the present invention provides a combination anti-drain back and by-pass valve one piece structure in which the rubber anti-drain back valve disc is completely covered by and therefore fully supported by the anti-drain back resilient leaf spring over its entire area which is substantially coextensive with the inside and outside diameters of the rubber valve disc. In conventional anti-drain back valve members wherein the spring member is a peripheral ring retaining the anti-drain back valve rubber disc member adjacent its circumferential portion or only adjacent the outside diameter of the rubber disc, it has been found in operation that the rubber disc will tend to blow through from under the retaining spring member due to hydraulic pressure. With the applicant's structure this difficulty is eliminated.

Inasmuch as various changes may be made in the arrangement and relative location of the several parts without departing from the spirit and scope of the invention, it is not meant to limit the invention except by the following claim.

I claim:

1. A spin on throwaway oil filter comprising a housing having a central outlet and an inlet in one end thereof disposed radially outwardly of said outlet, a filter support adjacent said outlet with a substantially vertical sleeve having an annular horizontal rim extending from the upper end of said sleeve with oil bypass ports therein, a casing secured to the outer edge of said annular horizontal rim, an annular bypass valve seated on said horizontal rim within said casing, biasing means enclosed in said casing forcing said bypass valve seated on said bypass ports, an annular anti-drainback valve welded to the bottom outer edge of said horizontal rim including an annular resilient metal spring member with a plurality of radial slotted fingers with horizontal inner and outer sections and a downwardly inclined section between them and an annular non-supporting rubber disc secured to the underside of said metal spring member, said metal spring member being pressed against and in contact with the upper surface of said non-supporting rubber disc and covering its entire area to prevent blow-out and rupture of said rubber disc, an annular filter element seated on said horizontal rim between said inlet and outlet for filtering oil passed therethrough, said horizontal rim and bypass valve and said anti-drainback valve non-supporting rubber disc being disposed in spaced direct communication with said inlet ports and in parallel flow relationship therewith for oil being filtered by said element and for oil bypassing said element.

References Cited

UNITED STATES PATENTS 2,888,141   5/1959   Coates et al.
3,146,194   8/1964   Hathaway.
3,332,554   7/1967   Humbert.
3,339,738   9/1967   Wilhelm.

REUBEN FRIEDMAN, Primary Examiner

F. A. SPEAR, JR., Assistant Examiner

U.S. Cl. X.R.

210—136, 440, 443